(12) United States Patent
Bykov et al.

(10) Patent No.: US 9,513,882 B2
(45) Date of Patent: Dec. 6, 2016

(54) PLATFORM INDEPENDENT PRESENTATION COMPOSITION

(75) Inventors: Evgueni N. Bykov, Kenmore, WA (US); Ferit Findik, Seattle, WA (US); Ryan S. Benson, Renton, WA (US); Volodymyr V. Otryshko, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 568 days.

(21) Appl. No.: 12/760,565

(22) Filed: Apr. 15, 2010

(65) Prior Publication Data
US 2011/0258596 A1 Oct. 20, 2011

(51) Int. Cl.
*G06F 9/44* (2006.01)
*G06Q 10/06* (2012.01)

(52) U.S. Cl.
CPC . *G06F 8/38* (2013.01); *G06F 8/10* (2013.01); *G06Q 10/06* (2013.01)

(58) Field of Classification Search
CPC ............ G06F 8/38; G06F 8/10; G06Q 10/06
See application file for complete search history.

(56) References Cited

U.S. PATENT DOCUMENTS

| | | | |
|---|---|---|---|
| 6,237,004 B1 | 5/2001 | Dodson | |
| 6,476,833 B1* | 11/2002 | Moshfeghi | 715/854 |
| 7,392,483 B2 | 6/2008 | Wong et al. | |
| 7,424,485 B2* | 9/2008 | Kristiansen | G06F 8/38 |
| 8,433,729 B2* | 4/2013 | Eigemann | G06F 8/38 707/796 |
| 9,372,675 B1* | 6/2016 | Pescosolido | G06F 8/38 |
| 2001/0052108 A1* | 12/2001 | Bowman-Amuah | G06Q 10/06 717/100 |
| 2002/0144233 A1* | 10/2002 | Chong et al. | 717/105 |
| 2003/0028861 A1 | 2/2003 | Wallman et al. | |
| 2003/0070061 A1* | 4/2003 | Wong et al. | 712/220 |

(Continued)

FOREIGN PATENT DOCUMENTS

| | | |
|---|---|---|
| CN | 101213540 A | 7/2008 |
| JP | 2003330715 A | 11/2003 |

OTHER PUBLICATIONS

D. D. Chamberlin et al., "Sequel 2: A Unified Approach to Data Definition, Manipulation, and Control", [Online], 1976, pp. 560-575, [Retrieved from Internet on Aug. 29, 2016], <http://ieeexplore.ieee.org/stamp/stamp.jsp?arnumber=5391051>.*

(Continued)

*Primary Examiner* — Thuy Dao
*Assistant Examiner* — Ziaul A Chowdhury
(74) *Attorney, Agent, or Firm* — Henry Gabryjelski; Kate Drakos; Micky Minhas

(57) ABSTRACT

Architecture that includes a platform independent, configuration driven, presentation composition engine. The composition engine that allows dynamic generation of multiplatform user experience (UX) based on a data contract. By composition, the user can select the parts, interactions, and constraints between the interaction and parts, as well as the placement with respect to each other. The UX is dynamically composed from components that are targeted to particular data classes. At runtime, platform dependent component implementations are automatically selected by the engine based on the execution platform of the composition host. A user can create or customize the UX without writing code by composing from a wide variety of presentation widgets that access a wide variety of data sources that can work on many platforms. Compositions are targeted to both a data class and presentation type and can be either predefined or generated.

20 Claims, 14 Drawing Sheets

(56) References Cited

U.S. PATENT DOCUMENTS

| | | | | |
|---|---|---|---|---|
| 2004/0034833 | A1* | 2/2004 | Kougiouris et al. | 715/513 |
| 2005/0043982 | A1* | 2/2005 | Nguyen | 705/8 |
| 2005/0086648 | A1* | 4/2005 | Andrews et al. | 717/135 |
| 2005/0114361 | A1* | 5/2005 | Roberts | G06F 8/38 |
| 2006/0123345 | A1 | 6/2006 | Parimi | |
| 2006/0200749 | A1* | 9/2006 | Shenfield | G06F 8/38 715/239 |
| 2006/0242124 | A1* | 10/2006 | Fields | G06F 8/38 |
| 2006/0248506 | A1* | 11/2006 | Luo | G06F 8/38 717/104 |
| 2007/0130205 | A1 | 6/2007 | Dengler et al. | |
| 2007/0180432 | A1 | 8/2007 | Gassner et al. | |
| 2008/0098348 | A1* | 4/2008 | Olson | G06F 8/20 717/104 |
| 2008/0148283 | A1* | 6/2008 | Allen et al. | 719/316 |
| 2008/0155406 | A1* | 6/2008 | Naka | G06F 8/38 715/700 |
| 2008/0163164 | A1* | 7/2008 | Chowdhary | G06Q 10/06 717/106 |
| 2008/0168131 | A1* | 7/2008 | Maker et al. | 709/203 |
| 2008/0189680 | A1* | 8/2008 | Brown | G06F 9/4443 717/106 |
| 2008/0263509 | A1* | 10/2008 | Brutman | G06F 8/20 717/104 |
| 2008/0270944 | A1* | 10/2008 | Balfe | G06F 8/38 715/848 |
| 2008/0295004 | A1* | 11/2008 | Coca et al. | 715/763 |
| 2008/0313282 | A1* | 12/2008 | Warila et al. | 709/206 |
| 2009/0006954 | A1* | 1/2009 | Jackson et al. | 715/700 |
| 2009/0013310 | A1* | 1/2009 | Arner | G06F 8/38 717/120 |
| 2009/0019380 | A1* | 1/2009 | Tanaka | G06F 8/38 715/763 |
| 2009/0094573 | A1* | 4/2009 | Skriletz | G06F 8/20 717/101 |
| 2009/0183185 | A1* | 7/2009 | Srour | G06Q 10/06 719/328 |
| 2009/0235229 | A1* | 9/2009 | Dangeville | G06F 8/38 717/105 |
| 2009/0281996 | A1* | 11/2009 | Liu | G06F 8/10 |
| 2009/0319981 | A1* | 12/2009 | Akkiraju | G06F 8/10 717/104 |
| 2009/0322786 | A1 | 12/2009 | Finger et al. | |
| 2009/0326687 | A1* | 12/2009 | McCoy | G06F 8/10 700/90 |
| 2009/0327094 | A1 | 12/2009 | Elien et al. | |
| 2010/0023547 | A1* | 1/2010 | Brid | 707/102 |
| 2010/0077298 | A1 | 3/2010 | Schreiber et al. | |
| 2012/0117496 | A1* | 5/2012 | Malhotra | G06F 8/38 715/762 |

OTHER PUBLICATIONS

Alan Brown et al., "Using Service-Oriented Architecture and Component-Based Development to Build Web Service Applications", [Online], 2002, pp. 1-16, [Retrieved from Internet on Aug. 29, 2016], <http://dit.isuct.ru/Publish_RUP/soa.rup_soma/guidances/whitepapers/resources/using_soa_and_cbd_to_build_ws_applications.pdf>.*

Jack Greenfield et al., "Software Factories Assembling Applications with Patterns, Models, Frameworks and Tools", [Online], 2003, pp. 16-27, [Retrieved from Internet on Aug. 29, 2016], <http://delivery.acm.org/10.1145/950000/949348/p16-greenfield.pdf>.*

Gregory Biegel et al., "A Framework for Developing Mobile, Context-aware Applications", [Online], 2004, pp. 1-5, [Retrieved from Internet on Aug. 29, 2016], <http://ieeexplore.ieee.org/stamp/stamp.jsp?arnumber=1276875>.*

"When to Use This Guidance", Retrieved at << http://msdn.microsoft.com/en-us/library/dd490815.aspx >>, Oct. 2009.

Arthorne, John., "White Paper: e4 Technical Overview", Retrieved at << http://www.eclipse.org/e4/resources/e4-whitepaper.php >>, Jul. 29, 2009.

"Introduction", Retrieved at << http://www.dieter.handshake.de/pyprojects/zope/book/chap1.html >>, Retrieved Date: Jan. 22, 2010.

"UX Concepts—Rethinking the Button", Retrieved at << http://blog.nukeation.com/post/UX-Concepts---Rethinking-the-Button.aspx >>, Retrieved Date: Jan. 22, 2010.

Sklar, et al., "An Introduction to Windows Presentation Foundation", Retrieved at << http://msdn.microsoft.com/en-us/library/aa480192.aspx >>, Sep. 2005.

"Designing with Windows Presentation Foundation", Retrieved at << http://msdn.microsoft.com/en-us/library/aa511329.aspx >>, Retrieved Date: Jan. 22, 2010.

"Studio for WPF", Retrieved at << http://www.microway.com.au/catalog/componentone/studio_wpf.stm >>, Retrieved Date: Jan. 22, 2010.

"Windows Presentation Foundation (WPF) and Silverlight Introduction: Hands-On", Retrieved at << http://www.learningtree.com/courses/975.htm >>, Retrieved Date: Jan. 22, 2010.

"International Search Report", Mailed Date: Nov. 29, 2011, Application No. PCT/US2011/030068, Filed Date: Mar. 25, 2011, pp. 9.

Australian Patent Application No. 2011241007, Office Action dated May 28, 2014, 3 pages.

Australian Patent Application No. 2011241007, Amendment dated Jun. 30, 2014, 4 pages.

European Patent Application No. 11769274.9, Amendment dated Jun. 10, 2014, 19 pages.

"Office Action and Search Report received for Chinese Patent Application No. 201180018954.X", Mailed date: Nov. 14, 2014, 13 Pages.

Australian Patent Application No. 2011241007, Notice of Acceptance dated Aug. 19, 2014, 2 pages.

European Patent Application No. 11769274.9, Supplemental Response dated Sep. 5, 2014, 6 pages.

Australian Patent Application No. 2011241007, Office Action dated Feb. 27, 2014, 4 pages.

Australian Patent Application No. 2011241007, Amendment dated Apr. 24, 2014, 22 pages.

European Patent Application No. 11769274.9, Supplementary European Search Report and the European Search Opinion, dated Jan. 7, 2014, 12 pages.

"Office Action Received for Japanese Patent Application No. 2013-504916", Mailed Date: Apr. 1, 2015, 9 Pages.

Chinese Patent Application No. 201180018954.X, Amendment dated Mar. 27, 2015, 12 pages (including English language summary and amended claims.).

Japanese Patent Application No. 2013-504916 (counterpart foreign application to U.S. Appl. No. 12/760,565) Response dated Jun. 8, 2015, 15 pages.

"Second Office Action and Search Report Issued in Chinese Patent Application No. 201180018954.X" (Foreign counterpart application to U.S. Appl. No. 12/760,565), Mailed Date: Jul. 28, 2015, 12 Pages.

Chinese Patent Application No. 201180018954.X (counterpart foreign application to U.S. Appl. No. 12/760,565) Response dated Oct. 12, 2015, 13 pages (including English translation of amended claims).

"Office Action Issued in Japanese Patent Application No. 2013-504916", Mailed Date: Nov. 6, 2015, 4 Pages.

Japanese Patent Application No. 2013-504916, Amendment dated Jan. 27, 2016, 6 pages.

Chinese Patent Application No. 201180018954, Office Action dated Jan. 29, 2016, 13 pages.

Chinese Patent Application No. 201180018954, Summary of Office Action dated Jan. 29, 2016, 1 page.

"Office Action Issued in European Patent Application No. 11769274.9", (foreign counterpart to U.S. Appl. No. 12/760,565) Mailed Date: Mar. 4, 2016, 9 Pages.

Ferguson, Arron, "Creating a Declarative XML UI Language", Retrieved from <<http://www.ibm.com/developerworks/library/x-decxmlui/x-decxmlui-pdf.pdf>>, Sep. 1, 2009, 23 Pages.

(56) References Cited

OTHER PUBLICATIONS

Nacar, et al., "Designing Grid Tag Libraries and Grid Beans", In Second International Workshop on Grid Computing Environments, Nov. 13, 2006, 9 Pages.

"Notice of Allowance Issued in Japanese Patent Application No. 2013-504916", Mailed Date: Apr. 14, 2016, 4 Pages.

"Office Action Issued in Korean Patent Application 10-2012-7026789", Mailed Date: Jul. 19, 2016, 8 Pages.

* cited by examiner

PLATFORM INDEPENDENT PRESENTATION COMPOSITION

BACKGROUND

The quality of a user experience (UX) is based on how well the UX is aligned with the user expectations. Having to deal with many data types, many data sources, and many UX platforms, designers have to make a choice from unattractive approaches that include writing presentation code for a specific persona that consumes specific data from data sources for a specific UX platform, or providing a broadly targeted UX that does not meet the needs of any single persona.

For example, existing UX composition systems such as HTML (hypertext markup language), XAML (extensible application markup language), and XSLT (extensible stylesheet language transformations) are designed such that the markup code be developed for a specific platform. If the developer wants the code to work on several platforms a custom logic is to be built in the code to handle the platform differences. Moreover, existing UX composition systems require specific presentation be explicitly defined for every data interface element. The functionality that allows dynamic generation of UX elements based on underlying data structures the elements represent is limited to nonexistent, especially if the data structures are complex and/or inheritable.

As a result of these limitations, the mass market (e.g., email) may have been served, but the smaller communities of users (e.g., the exchange administrator or the CRM (customer relationship management) service owner) are underserved.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes a platform independent configuration-driven presentation composition engine. The composition engine allows dynamic generation of multiplatform user experience (UX) based on a data contract. By composition, the user can select the parts, interactions, and constraints between the interaction and parts, as well as the placement with respect to each other.

The UX is dynamically composed from components that are targeted to particular data classes. At runtime, platform dependent component implementations are automatically selected by the engine based on the execution platform of the composition host.

The disclosed architecture allows a user to create or customize a UX without writing code by composing from multiple presentation widgets that can access many data sources that work on many platforms. Compositions are targeted to both a data class and presentation type and can be either predefined or generated.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
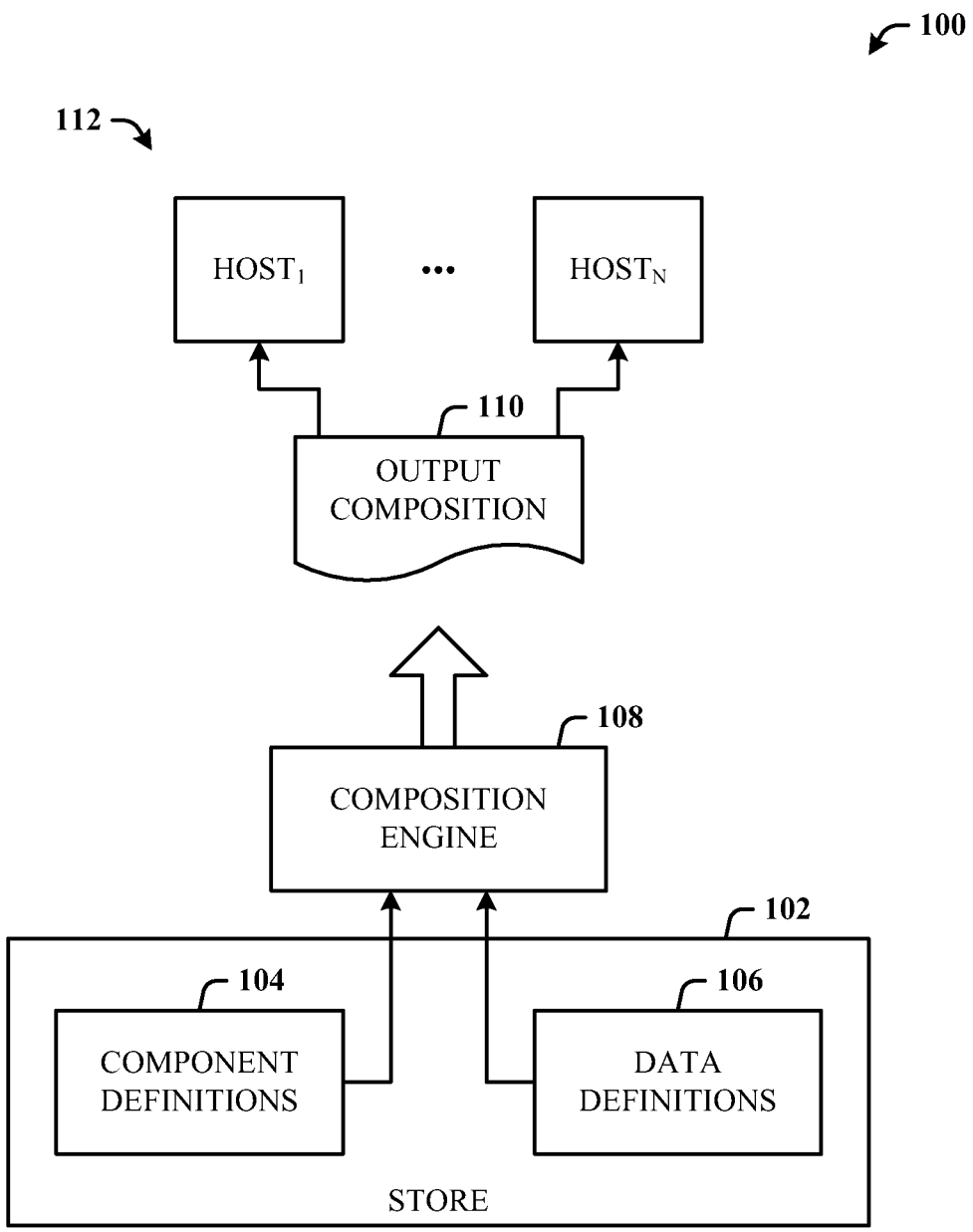
FIG. 1 illustrates a visualization system in accordance with the disclosed architecture.

The disclosed architecture is a presentation composition engine. The composition engine is a generic composition framework which is exposed as a set of services that allows the user to "glue" together (compose) different components, and the composition (output composition of the engine) of the component(s). By composition, the user can select the parts, interactions, and constraints between the interaction and parts, as well as the placement of the parts with respect to each other. The engine is a presentation-neutral framework for both UI (user interface) and non-UI components.

A component is the smallest reusable building block of UI declaration for the composition engine, and that is identifiable by name, and optionally, targeted to a data type. A component can be a base component (unit component) or a container component (composite component). Data context is an instance of target data for a component. In other words, the data context is a name/value pair set that represents data associated with a component. Data context entries support change notifications, and compositions can initiate changes and/or listen to the changes initiated by other compositions. The composition engine assembles components for a particular host as a user experience that is platform independent. The virtualization host is the execution environment of the composition for a particular platform (runtime).

Compositions are targeted to both a data class and presentation type and can be either predefined or generated. While there can be multiple components composed, the component chain ends at the concrete base component (e.g., a TextBox control, database query component, etc.).

The composition engine allows the dynamic generation of multiplatform UX (user experience) based on a data contract. The UX is dynamically composed from components that are targeted to a particular data classes. At runtime, platform dependent component implementations are automatically selected by the engine based on the execution platform of the composition host.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a visualization system 100 in accordance with the disclosed architecture. The system 100 includes a store 102 of store definitions that include component definitions 104 and data definitions 106 for components and data associated with a user experience. The component definitions 104 can include definitions for base component, container components, and compositions of base and container components. In this way, an existing composition of the components is readily available for dynamic selection and composition into the output component 110.

A composition engine 108 that automatically and declaratively composes an instance of an output component 110 based on a store definition. The output component is specific to a user experience of a visualization host of different hosts 112.

The output component 110 includes a base component, a container component, or a combination of base and container components. The output component 110 is composed based on a target data type of the user experience. The system 100 can further comprise a component registry via which a component is searched based on the target data type. The output component binds associated component properties to data context elements to link child components. The composition engine 108 includes global variables that enable data exchange between output components in unrelated data contexts.

Figure 2:
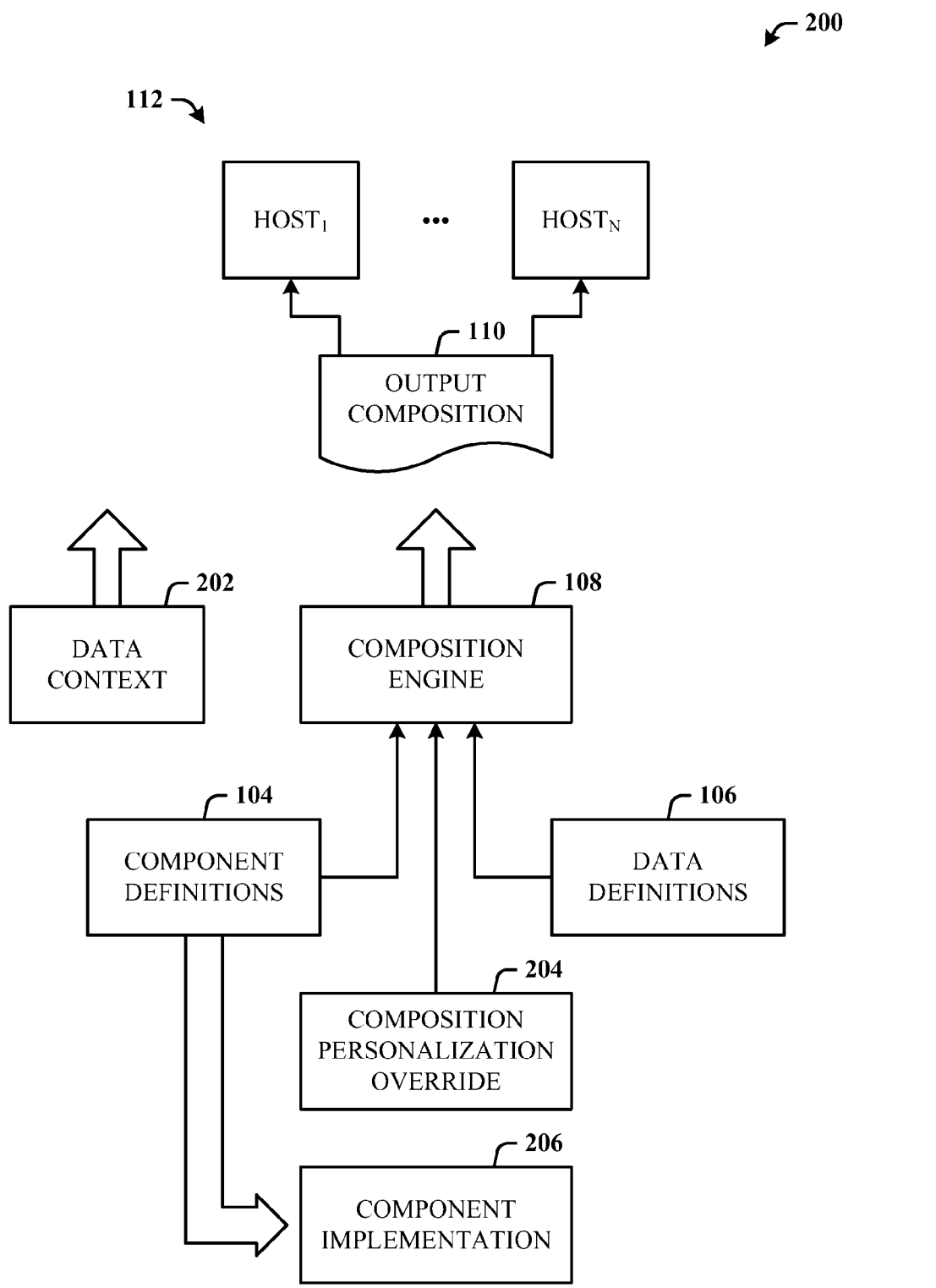
FIG. 2 illustrates an alternative visualization system in accordance with the disclosed architecture.

FIG. 2 illustrates an alternative visualization system 200 in accordance with the disclosed architecture. The system 200 includes the entities of the system 100 of FIG. 1, as well as data context 202, a personalization (private) override 204, and component implementation 206. The output component 110 can be composed based on the data context 202 rather than an existing component definition. That is, based on the data, a customized component can be created and output purely based on the context data 202 (instance of data in the target UX). The composition engine 108 employs the personalization override 204 that is composed with a selected component definition to override a global variable with a private variable.

Figure 3:
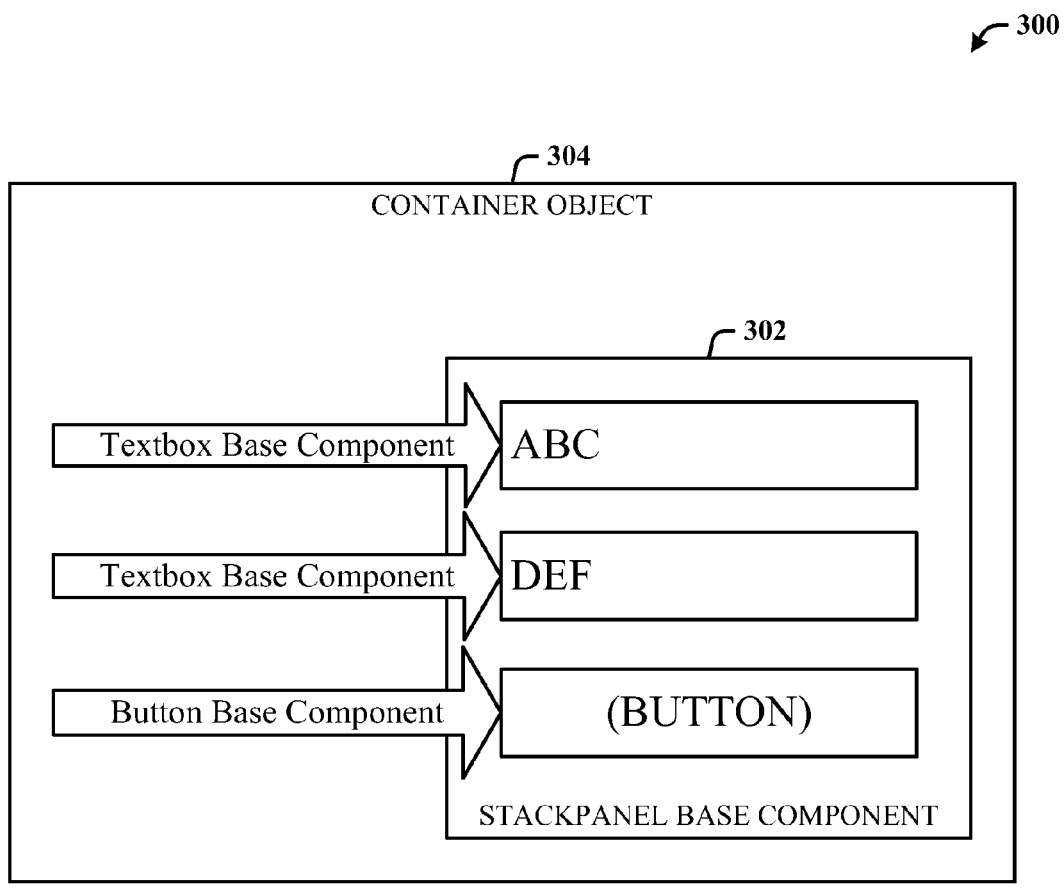
FIG. 3 illustrates an exemplary composition composed by the composition engine.

FIG. 3 illustrates an exemplary composition 300 composed by the composition engine. Here, the composition 300 is described in terms of based components (e.g., a StackPanel base component 302) and a container component 304. Here, the base component 302 includes two text box base components: a first text box base component showing text "ABC" and a second text box base component showing text "DEF". The base component 302 also includes a button base component.

The base component is a concrete implementation targeted to specific platforms, the leaf node of the composition process, and can be visual or non-visual. Following is an example of a base component definition (in terms of component type rather than component type).

```
<ComponentType ID="EventQuery">
    <Parameters>
        <Parameter Name="Scope" Type="String" />
        <Parameter Name="Output" Type="IEnumerable" />
    </Parameters>
</ComponentType>
<ComponentImplementation TypeId="EventQuery">
    <SupportedPlatforms>
        <Platform>WPF</Platform>
    </SupportedPlatforms>
    <Unit>
        <MefFactory>
<ContractName>Company.EnterpriseManagement.
EventQuery</ContractName>
        </MefFactory>
        <Properties>
            <Property Name="QueryVerb"
Direction="In">Events</Property>
            <Property Name="Scope"
Direction="In">$Parameter/Scope$</Property>
            <Property Name="Output"
Direction="Out">$Parameter/Output$</Property>
        </Properties>
    </Unit>
</ComponentImplementation>
```

The MEF (managed extensibility framework) factory calls an MEF runtime to pull corresponding types from registered UI assemblies. Note that MEF is just one way example implementation; other Factory implementations can be employed as well.

The container component (also, composite component) is the container for the base components (also, unit components), does not have a custom implementation, and is platform independent. Following is an example of a composite component definition.

```
<ComponentImplementation TypeId="SampleComponent">
    <SupportedPlatforms>
        <Platform>All</Platform>
    </SupportedPlatforms>
    <Composite>
        <Variables>
            <Variable Id="abc" Type="String" />
        </Variables>
        <Component TypeId="SampleContainerComponent">
            <Parameter Id="Child1">
                <Component TypeId="SampleComponent1">
                    <Parameter Id="Bla">$Variable/abc$</Parameter>
                </Component>
            </Parameter>
            <Parameter Id="Child2">
                <Component TypeId="SampleComponent2">
                    <Parameter Id="Bla">$Variable/abc$</Parameter>
                </Component>
            </Parameter>
        </Component>
    </Composite>
</ComponentImplementation>
```

In FIG. 3, the container component 304 combines the base components, as illustrated in the following code, where PropertyA is "ABC" and PropertyB is "DEF".

```
<Component TypeId="StackPanel">
    <Parameter Name="Child">
```

-continued

```
<Component TypeId="Edit">
    <Target>$Target/propertyA$</Target>
</Component>
<Component TypeId="Edit">
    <Target>$Target/propertyB$</Target>
</Component>
<Component TypeId="Button">
</Component>
    </Parameter>
```

Each component (base or container) is backed with a data context (Data Context) instance. Data Context is a key (string)-value(object) pair collection which supports property changed notification and error set notification. The component can bind its properties to data context elements to link child components together.

Figure 4:
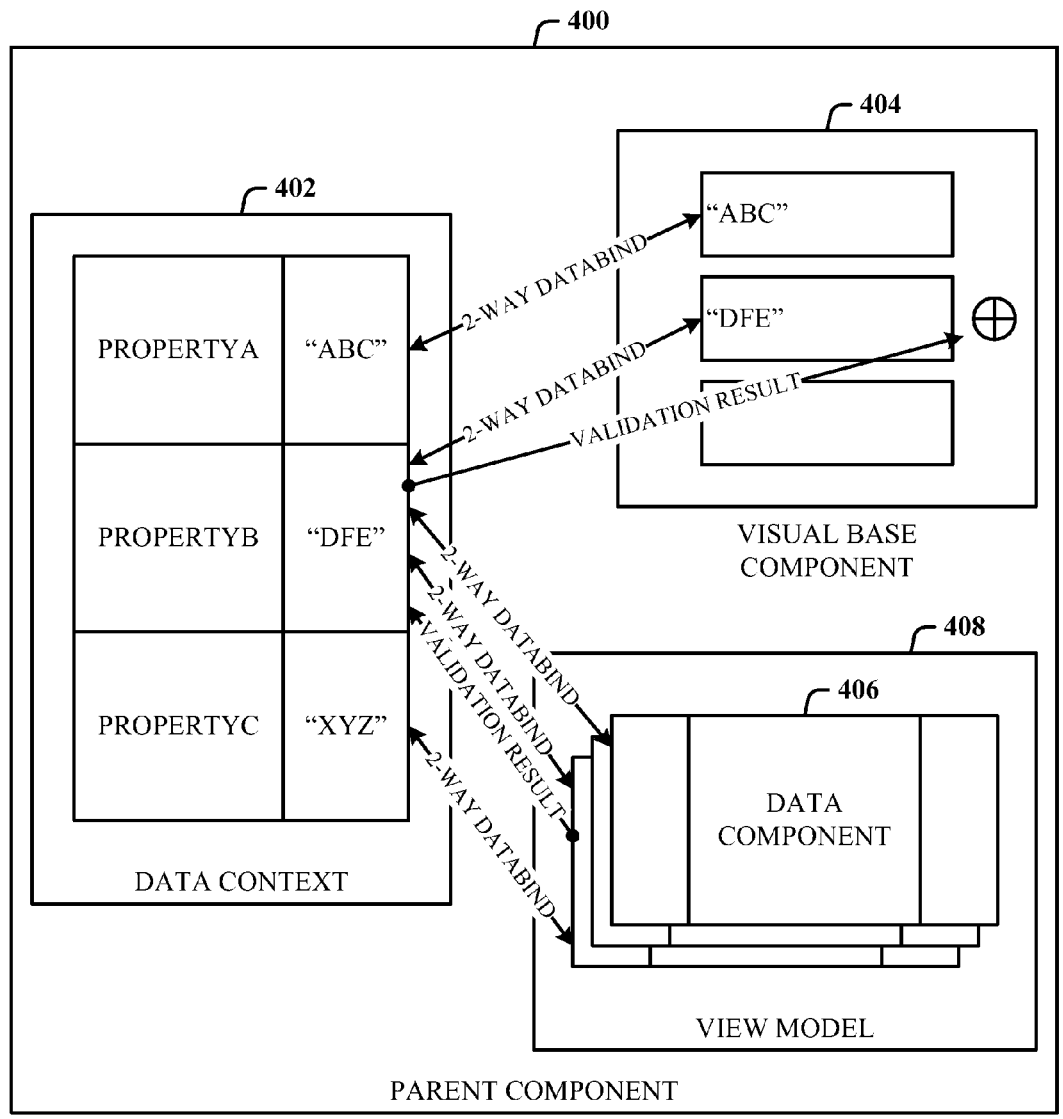
FIG. 4 illustrates a parent component that includes data context and a visual base component of a composition system.

FIG. 4 illustrates a parent component 400 that includes data context 402 (as DataContext elements) and a visual base component 404 (e.g., StackPanel base component 302 of FIG. 3) of a composition system. Here, the data context 402 includes three properties: PropertyA, PropertyB and PropertyC, with corresponding values "ABC", "DEF", and "XYZ". The visual base component 404 includes bindings to PropertyA and PropertyB via corresponding 2-way databinds, while multiple data components 406 of a view model 408 are bound to PropertyB and PropertyC. In other words, the parent component 400 is composed that includes bindings of properties to child components (the text box base components) and bindings of the properties to the data components 406.

Figure 5:
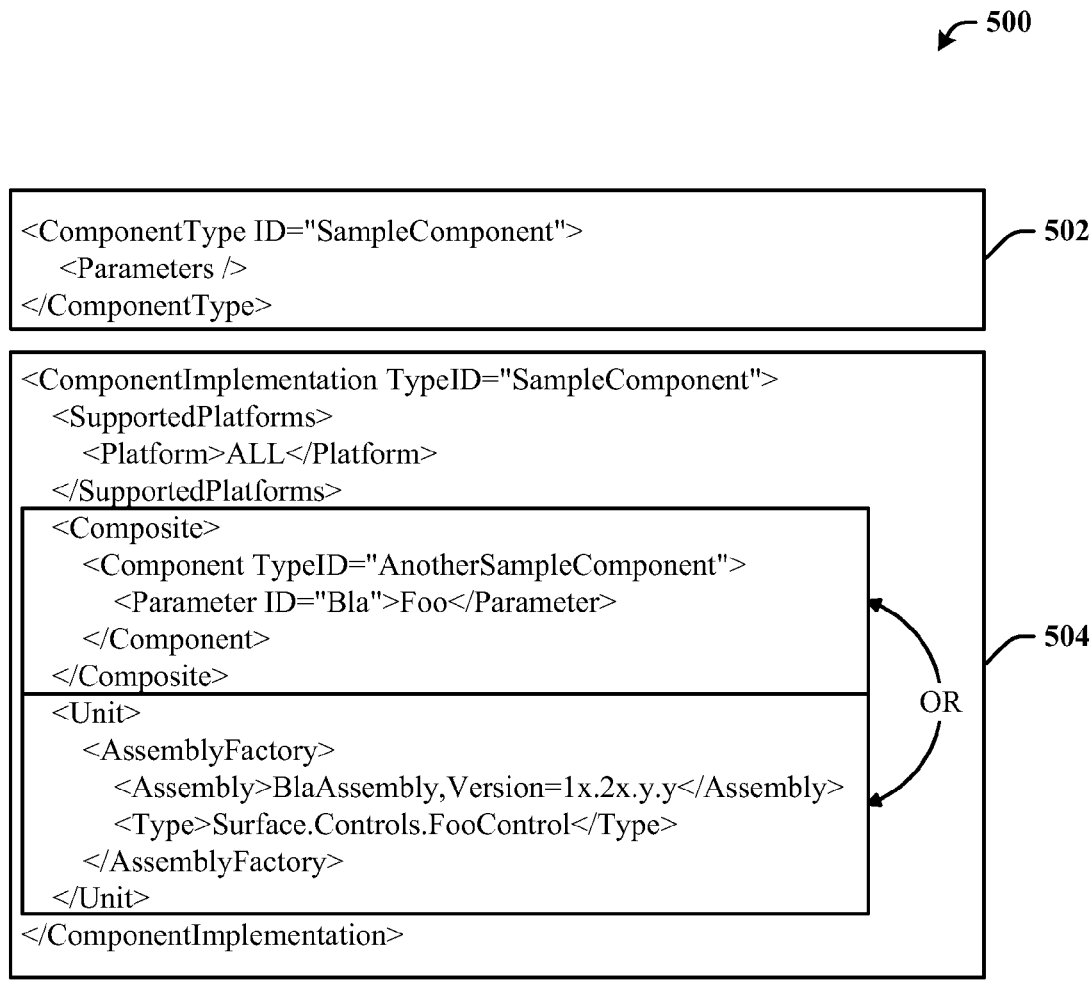
FIG. 5 illustrates a component definition.

FIG. 5 illustrates an component definition 500. The component definition 500 comprises two parts: a type declaration 502 and an implementation definition 504. Each component has a name, and optional target type attributes that can be used to look up a relevant component. An example type declaration (in component terms) is the following:

```
<ComponentType ID="SampleComponent" Target="String"
    Accessibility="Internal">
```

A component can also include a Parameters subnode which defines the datashape (e.g., string) expected to be passed, as illustrated below (in component terms):

```
<ComponentType ID="AnotherComposition">
    <Parameters>
        <Parameter Name="Parameter1" Type="String" />
        <Parameter Name="SelectedText" Type="String"
    BindingDirection="Both" />
    </Parameters>
```

Figure 6:
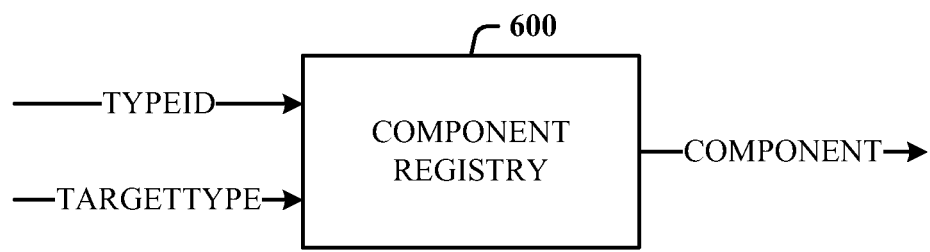
FIG. 6 illustrates a component registry for finding or selecting components.

FIG. 6 illustrates a component registry 600 for finding or selecting components. The registry 600 maintains a list of all defined components and component compositions. For example, the base component (e.g., StackPanel/Button/Edit of FIG. 3) can be looked up (searched) based on TypeId and TargetType (target data type). The output is then the base component that corresponds to the TargetType, or TypeId and TargetType.

To set a property on an component, a "Parameter" node is used, as shown in the following sample code:

```
<Component Id="EventView">
<Parameter Id="Scope">Microsoft.SystemCenter.SqlDB </Parameter>
```

In this case, the property "Scope" of component "EventView" is set to text "Company.SystemCenter.SqlDB". Oftentimes, however, parameters are not static, but are bound to other elements. In general, reference is in the form $<protocol>/<protocol-specific string>.

For example, two components are bound to a variable "abc":

```
<ComponentImplementation TypeId="SampleComponent">
    <SupportedPlatforms>
        <Platform>All</Platform>
    </SupportedPlatforms>
    <Composite>
        <Variables>
            <Variable Id="abc" Type="String" />
        </Variables>
        <Component TypeId="SampleComponent1">
            <Parameter Id="A">$Variable/abc$</Parameter>
        </Component>
        <Component TypeId="SampleComponent2">
            <Parameter Id="A">$Variable/abc$</Parameter>
        </Component>
    </Composite>
</ComponentImplementation>
```

Following is an example list of reference protocols in a Parameter node:

| | |
|---|---|
| $Parameter/ <propertyName>$ | Parameter passed to component |
| $Variable/ <propertyName>$ | Variable declared in component |
| $Target/ <propertyName>$ | Property of a target instance passed to component |
| $Target$ | Target instance |

Global variables can be used to enable data exchange between compositions (base components and/or container components) in non-related data contexts. First, a global variable is declared:
    <GlobalVariable                ID="GlobalSelectedItem" Type="String"/>
The variable can be referenced in base component and container components using $GlobalVariable/<variable name>$.

Any given component (e.g., base, container) can override the variable with a private implementation so that component children see a private copy of the variable, illustrated in the following example code:

```
<Variables>
    <GlobalVariableOverride GlobalVariableId="GlobalSelectedItem"
/>
</Variables>
```

Figure 7:
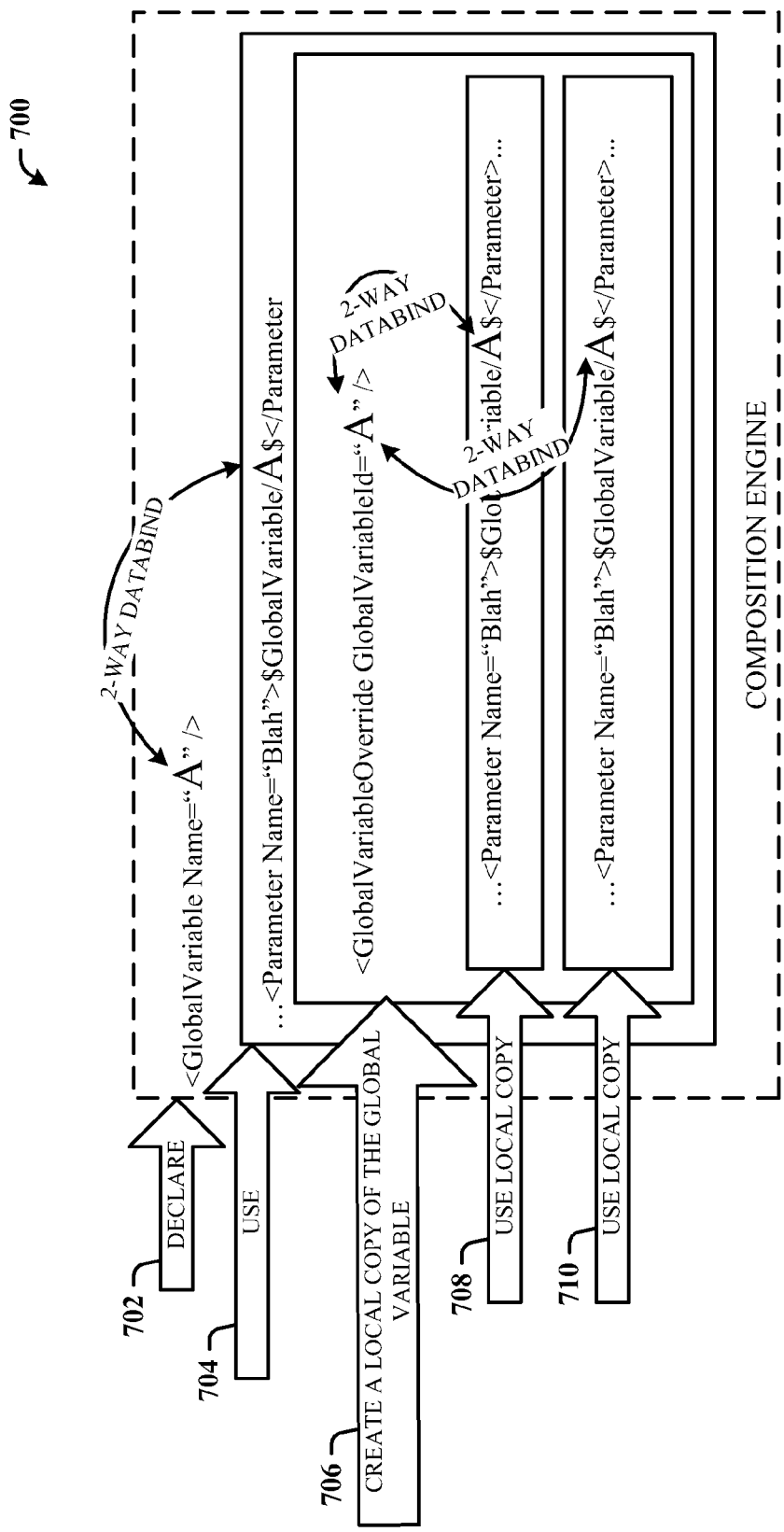
FIG. 7 illustrates a declarative diagram that represents the use of variables in the composition engine.

FIG. 7 illustrates a declarative diagram 700 that represents the use of variables in the composition engine. At 702, a global variable "A" is declared. At 704, a parameter name "Blah" is passed to an component. At 706, a local copy of the global variable is created. At 708 and 710, local copies of the variable are used rather than the global variable.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
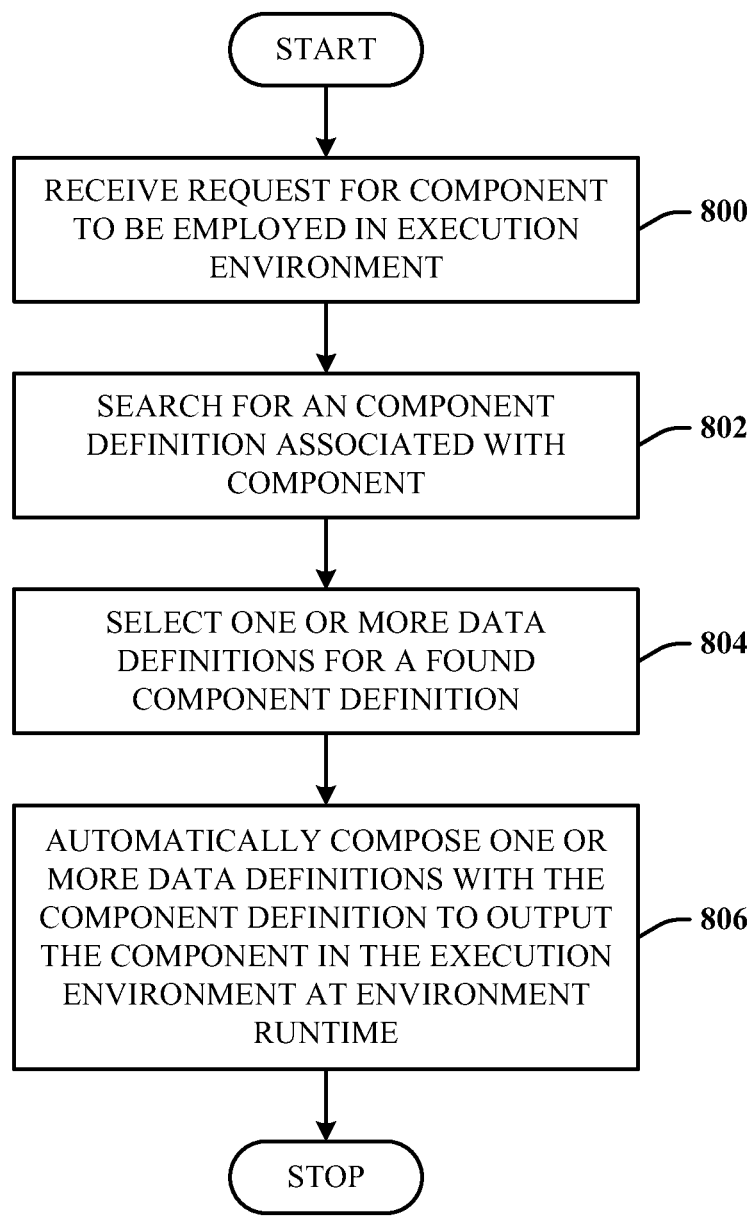
FIG. 8 illustrates a visualization method in accordance with the disclosed architecture.

FIG. 8 illustrates a visualization method in accordance with the disclosed architecture. At 800, a request is received for a component to be employed in an execution environment. At 802, a component definition associated with the component is searched. At 804, one or more data definitions are selected for a found component definition. At 806, the one or more data definitions are automatically composed with the component definition to output the component in the execution environment at environment runtime.

Figure 9:
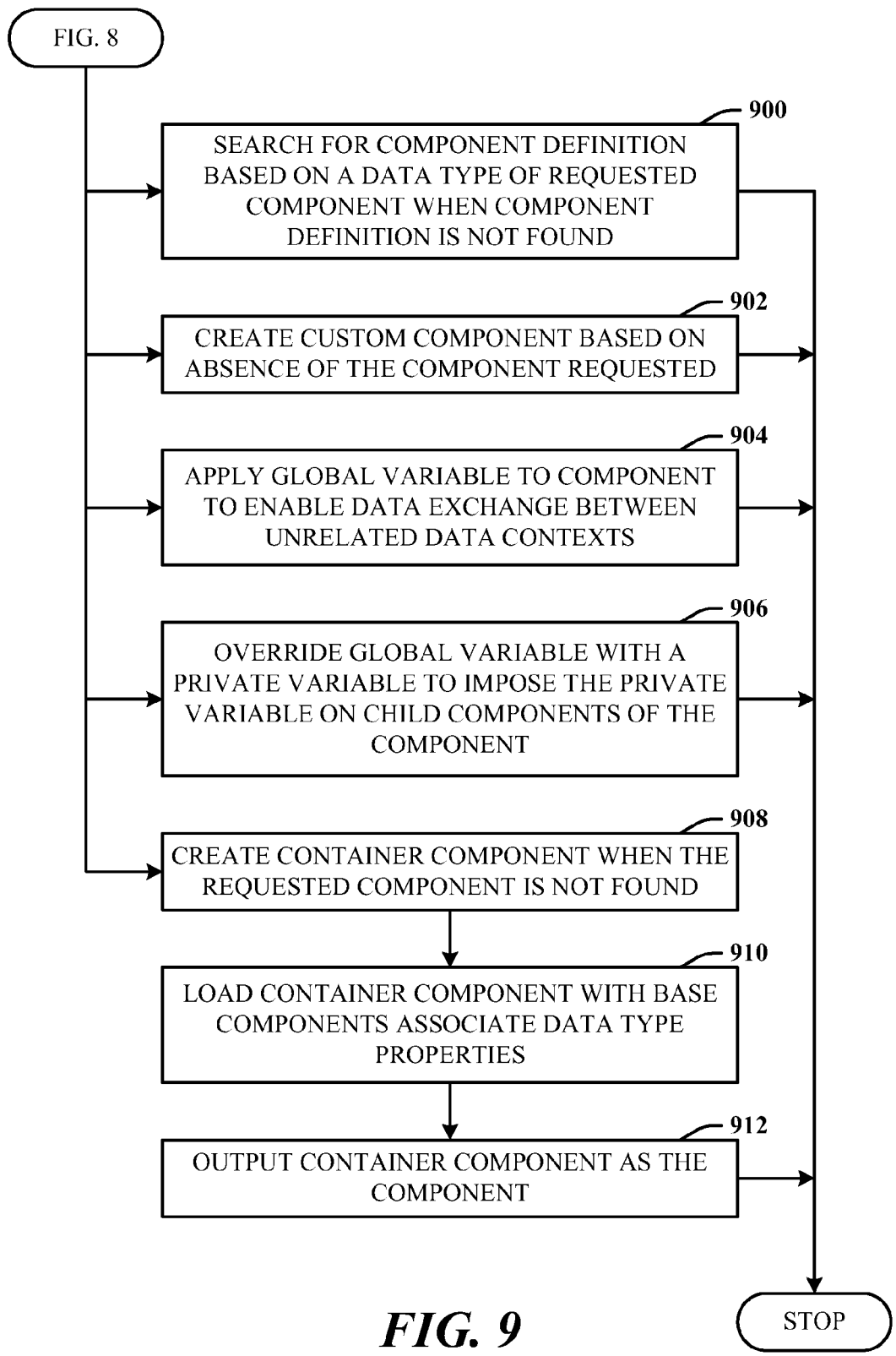
FIG. 9 illustrates further aspects of the method of FIG. 8.

FIG. 9 illustrates further aspects of the method of FIG. 8. At 900, the component definition is searched based on a data type of the requested component when the component definition is not found. At 902, a custom component is created based on absence of the component requested. At 904, a global variable is applied to the component to enable data exchange between unrelated data contexts. At 906, a global variable is overridden with a private variable to impose the private variable on child components of the component. At 908, a container component is created when the requested component is not found. At 910, the container component is loaded with base components associate data type properties. At 912, the container component is output as the component.

Figure 10:
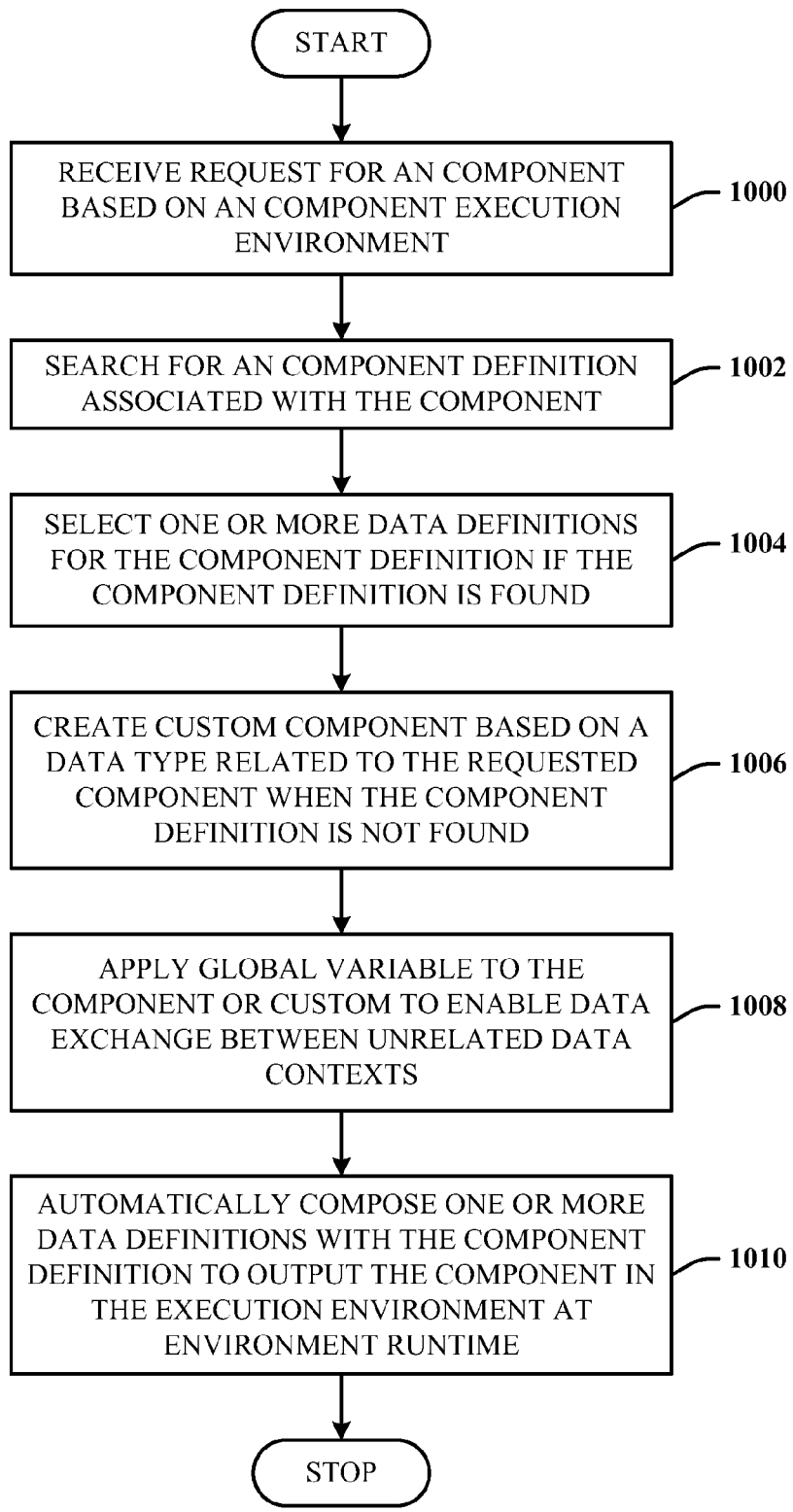
FIG. 10 illustrates an alternative visualization method.

FIG. 10 illustrates an alternative visualization method. At 1000, a request for a component based is received on a component execution environment. At 1002, a component definition associated with the component is searched. At 1004, one or more data definitions for the component definition are selected if the component definition is found. At 1006, a custom component is created based on a data type related to the requested component when the component definition is not found. At 1008, a global variable is applied to the component or custom to enable data exchange between unrelated data contexts. At 1010, the one or more data definitions are automatically composed with the component definition to output the component in the execution environment at environment runtime.

Figure 11:
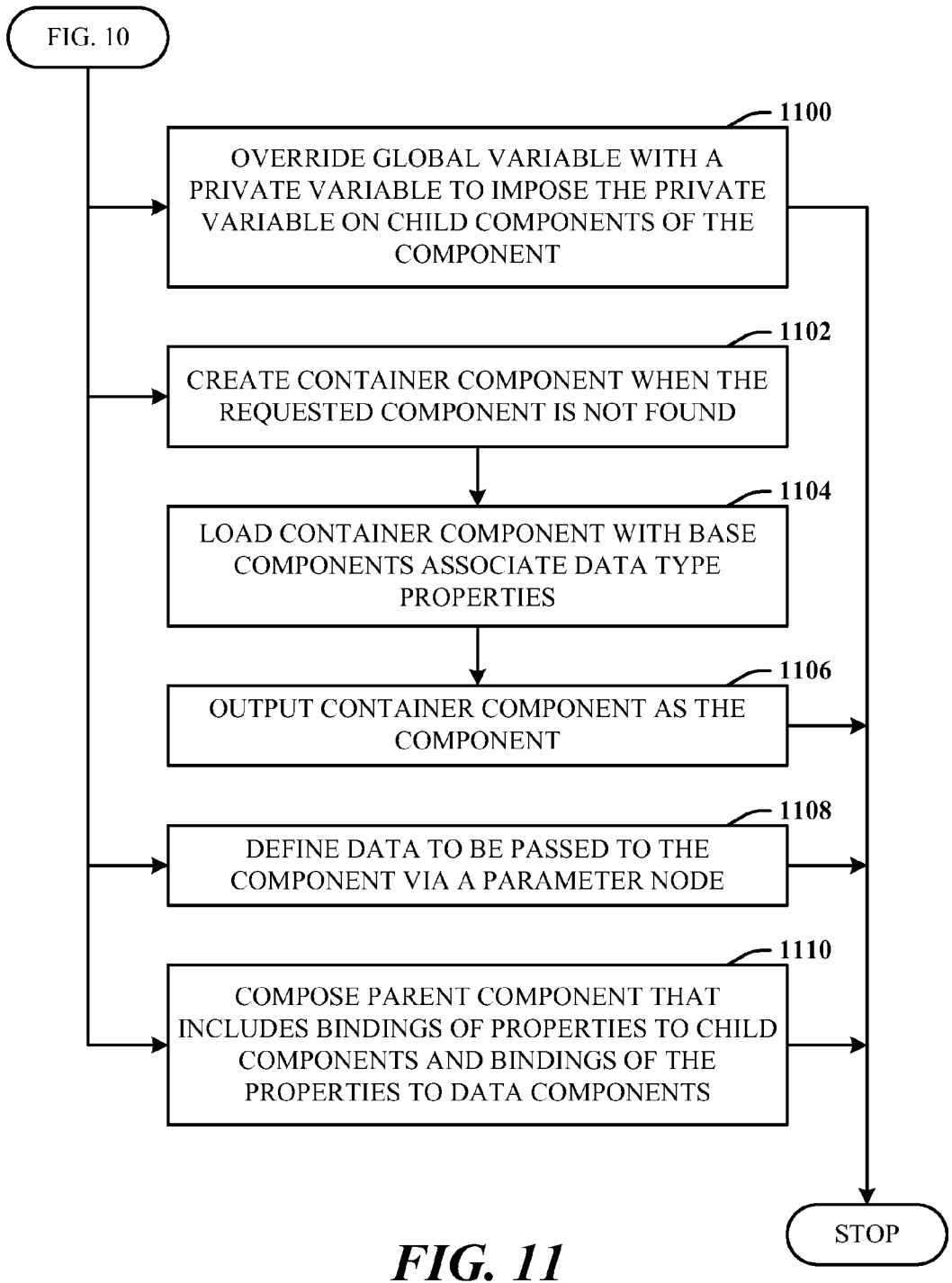
FIG. 11 illustrates further aspects of the method of FIG. 10.

FIG. 11 illustrates further aspects of the method of FIG. 10. At 1100, the global variable is overridden with a private variable to impose the private variable on child components of the component. At 1102, a container component is created when the requested component is not found. At 1104, the container component is loaded with base components associate data type properties. At 1106, the container component is output as the component. At 1108, data to be passed to the component is defined via a parameter node. At 1110, a parent component is composed that includes bindings of properties to child components and bindings of the properties to data components.

Figure 12:
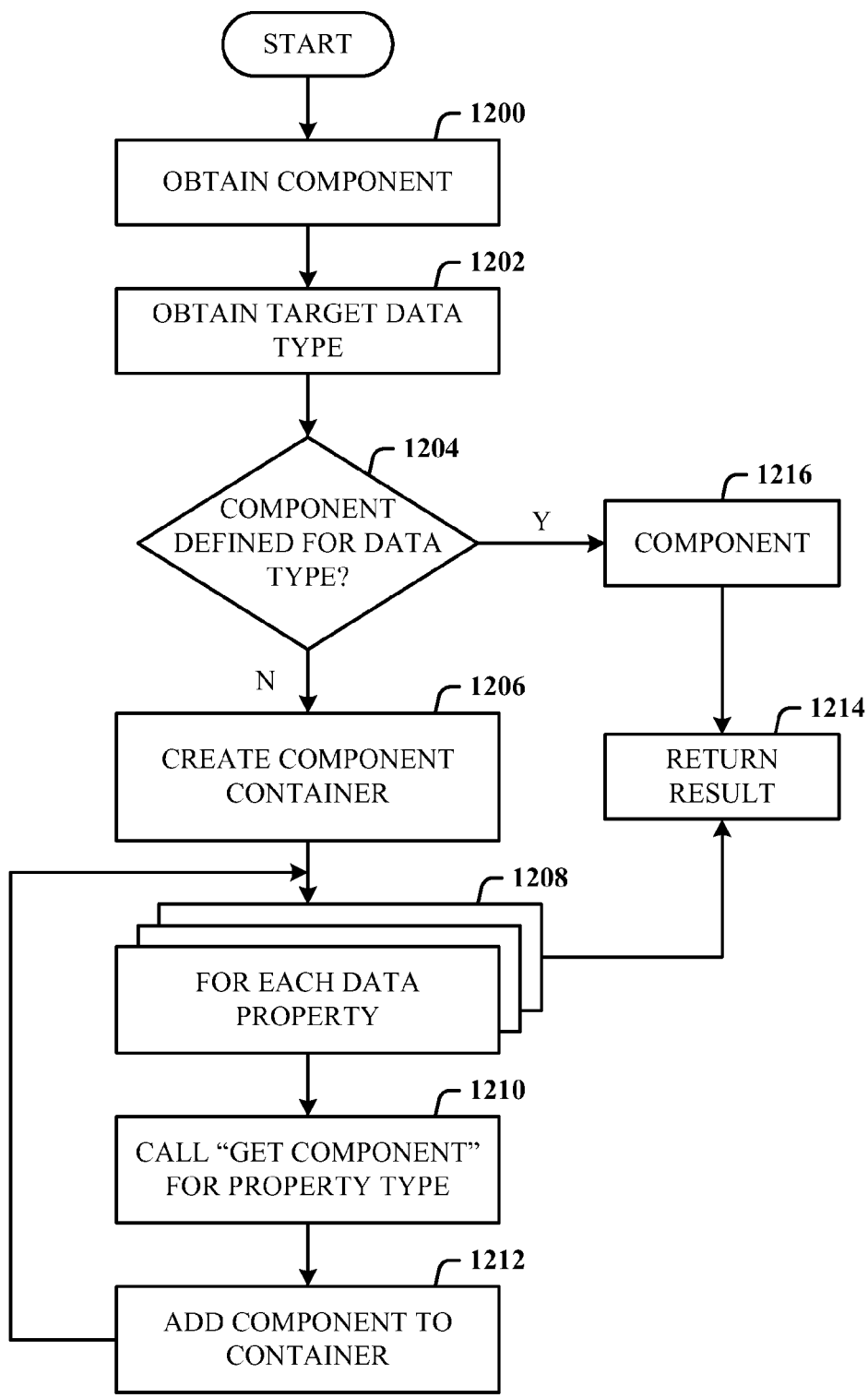
FIG. 12 illustrates a method of obtaining components in the composition engine.

FIG. 12 illustrates a method of obtaining components in the composition engine. At 1200, a component is obtained (e.g., via a "get component" call). At 1202, the target data type is obtained. At 1204, a check is made to determine of a component exists for the target data type. If not, flow is to 1206 to create a component container. The component can have one or more associated data properties. At 1208, property types are obtained for the component. At 1210, a call "get component" is made for the property types. At 1212, the component is added to the container. Flow is back to 1208 to continue until completed. After all data properties and types have been applied to the container, flow is to 1214 to return the results. At 1204, if the check determines that a component exists for the target data type, flow is to 1216 to select the component, and then return the results, at 1216.

Figure 13:
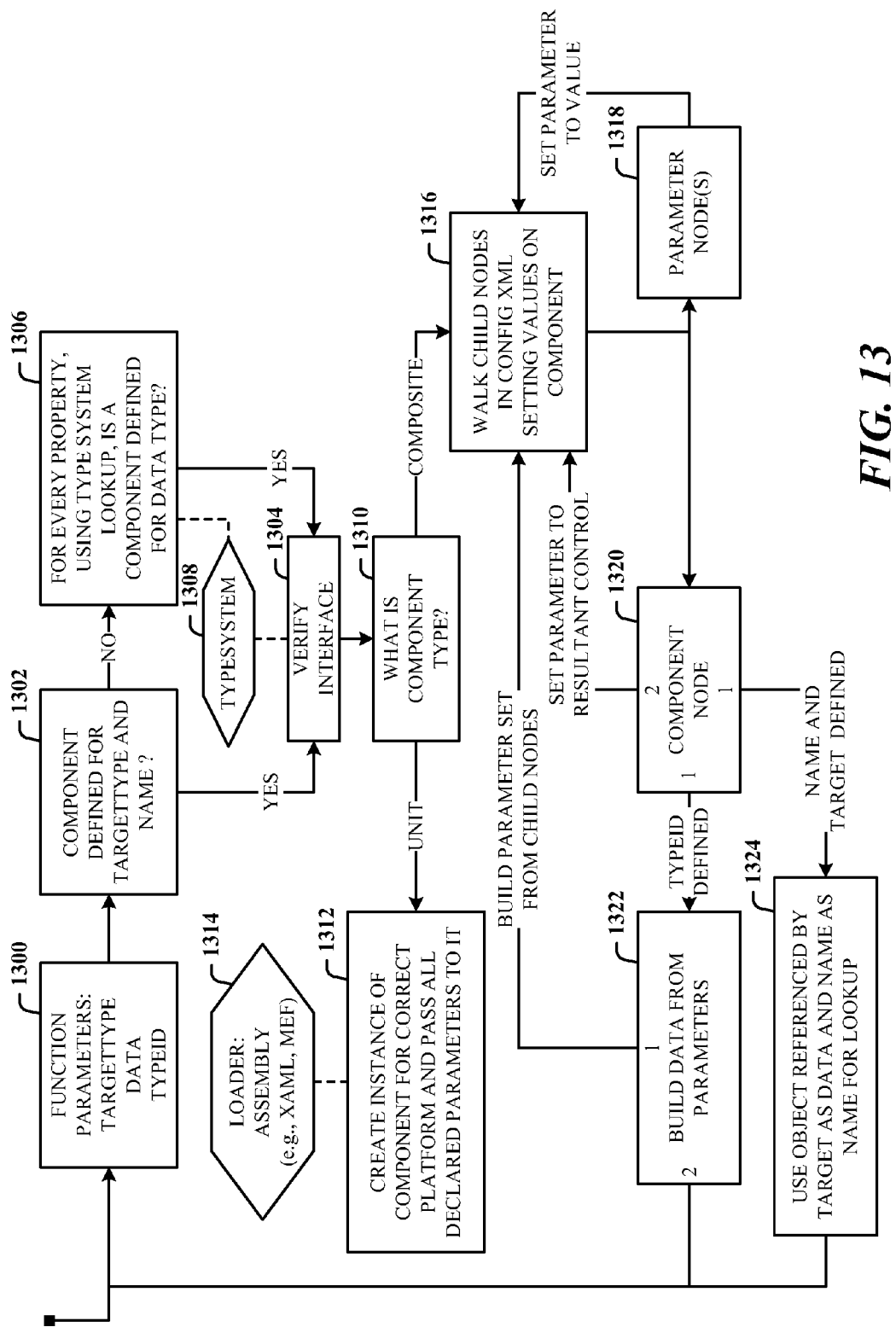
FIG. 13 illustrates a more detailed method of obtaining components in the composition engine.

FIG. 13 illustrates a more detailed method of obtaining components in the composition engine. At 1300, function parameters such as target type and data type are received. At 1302, a check is made for a component defined for the target type and name. If so, flow is to 1304 to verify the interface. Alternatively, if no component exists for the target type and names, flow is to 1306 such that for every property using the type system lookup, is a component defined for the data type. If yes, flow is to 1304 to verify the interface. Access to the type system 1308 is provided to make the check and verify the interface. Once the interface is verified, flow is to 1310 to check for the component type. If a unit component, flow is to 1312 to create an instance of the unit component for the correct platform and pass all declared parameters to the unit component. At 1314, the loader can load an assembly for the UX composition system (e.g., XAML, MEF, etc).

If the component type, at 1310, is a composite component, flow is to 1316 to walk the child nodes in a configuration (e.g., written in XML) setting the values on the components of the composition. This includes receiving parameter values from parameter node(s) 1318, parameters from component node(s) 1320, and a parameter set from child nodes, as provided from build data from parameters at 1322. The typeID is sent from the component node 1320 to build data 1322. At 1324, the component referenced by the target as data and name, as the name for lookup, based on name and target information received from the component node 1320.

One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 14:
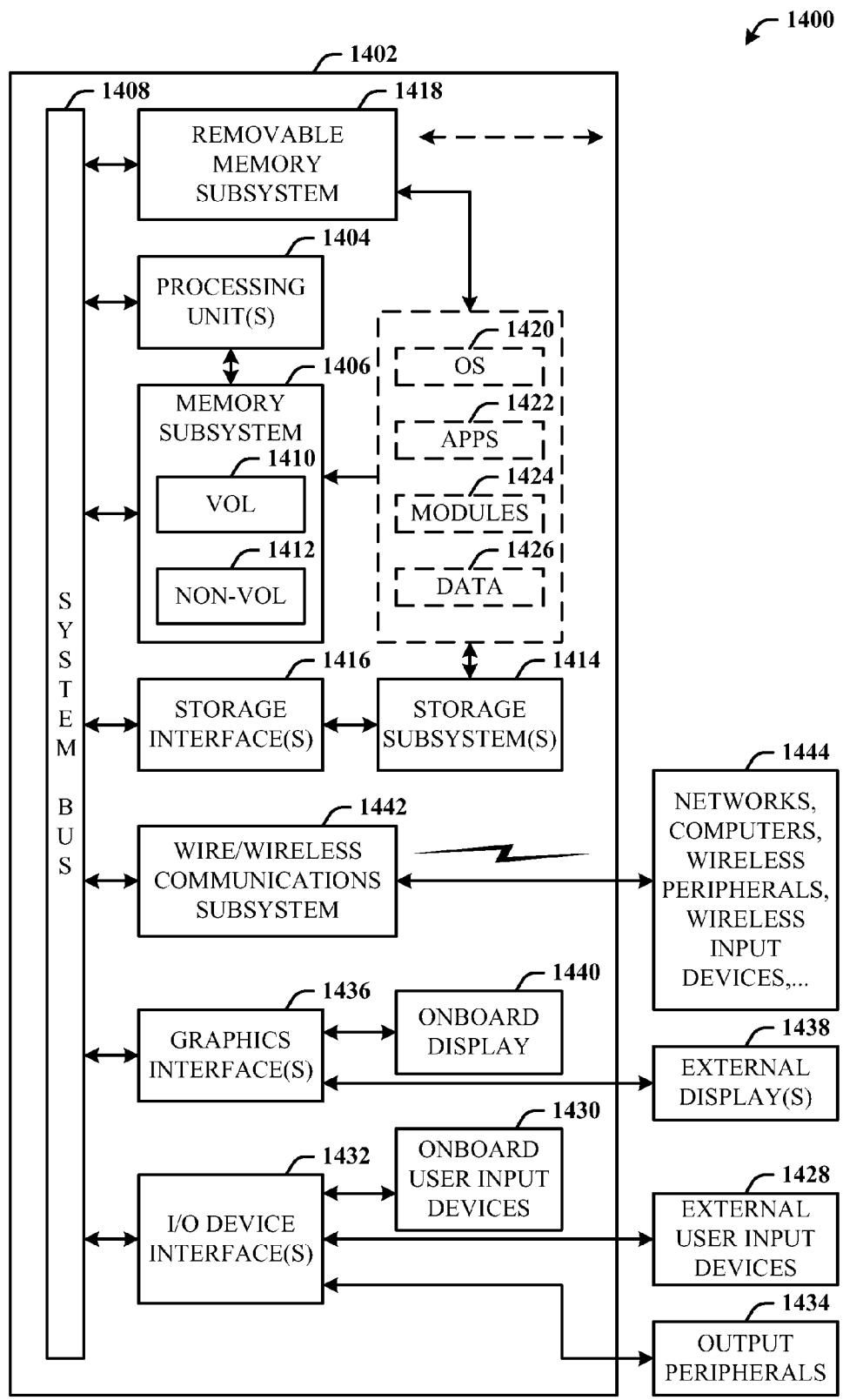
FIG. 14 illustrates a block diagram of a computing system that executes composition in accordance with the disclosed architecture.

Referring now to FIG. 14, there is illustrated a block diagram of a computing system 1400 that executes composition in accordance with the disclosed architecture. In order to provide additional context for various aspects thereof, FIG. 14 and the following description are intended to provide a brief, general description of the suitable computing system 1400 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1400 for implementing various aspects includes the computer 1402 having processing unit(s) 1404, a computer-readable storage such as a system memory 1406, and a system bus 1408. The processing unit(s) 1404 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1406 can include computer-readable storage (physical storage media) such as a volatile (VOL) memory 1410 (e.g., random access memory (RAM)) and non-volatile memory (NON-VOL) 1412 (e.g., ROM, EPROM, EEPROM, etc.). A basic input/output system (BIOS) can be stored in the non-volatile memory 1412, and includes the basic routines that facilitate the communication of data and signals between components within the computer 1402, such as during startup. The volatile memory 1410 can also include a high-speed RAM such as static RAM for caching data.

The system bus 1408 provides an interface for system components including, but not limited to, the system memory 1406 to the processing unit(s) 1404. The system bus 1408 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1402 further includes machine readable storage subsystem(s) 1414 and storage interface(s) 1416 for interfacing the storage subsystem(s) 1414 to the system bus 1408 and other desired computer components. The storage subsystem(s) 1414 (physical storage media) can include one or more of a hard disk drive (HDD), a magnetic floppy disk drive (FDD), and/or optical disk storage drive (e.g., a CD-ROM drive DVD drive), for example. The storage interface(s) 1416 can include interface technologies such as EIDE, ATA, SATA, and IEEE 1394, for example.

One or more programs and data can be stored in the memory subsystem 1406, a machine readable and removable memory subsystem 1418 (e.g., flash drive form factor technology), and/or the storage subsystem(s) 1414 (e.g., optical, magnetic, solid state), including an operating system 1420, one or more application programs 1422, other program modules 1424, and program data 1426.

The one or more application programs 1422, other program modules 1424, and program data 1426 can include the entities and components of the system 100 of FIG. 1, the entities and components of the system 200 of FIG. 2, the composition 300 of FIG. 3, the parent component 400 of FIG. 4, the component definition 500 of FIG. 5, the registry 600 of FIG. 6, the diagram 700 of FIG. 7, and the methods represented by the flowcharts of FIGS. 8-13, for example.

Generally, programs include routines, methods, data structures, other software components, etc., that perform particular tasks or implement particular abstract data types. All or portions of the operating system 1420, applications 1422, modules 1424, and/or data 1426 can also be cached in memory such as the volatile memory 1410, for example. It is to be appreciated that the disclosed architecture can be implemented with various commercially available operating systems or combinations of operating systems (e.g., as virtual machines).

The storage subsystem(s) 1414 and memory subsystems (1406 and 1418) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1402 and includes volatile and non-volatile internal and/or external media that is removable or non-removable. For the computer 1402, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1402, programs, and data using external user input devices 1428 such as a keyboard and a mouse. Other external user input devices 1428 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1402, programs, and data using onboard user input devices 1430 such a touchpad, microphone, keyboard, etc., where the computer 1402 is a portable computer, for example. These and other input devices are connected to the processing unit(s) 1404 through input/output (I/O) device interface(s) 1432 via the system bus 1408, but can be connected by other interfaces such as a parallel port, IEEE 1394 serial port, a game port, a USB port, an IR interface, etc. The I/O device interface(s) 1432 also facilitate the use of output peripherals 1434 such as printers, audio devices, camera devices, and so on, such as a sound card and/or onboard audio processing capability.

One or more graphics interface(s) 1436 (also commonly referred to as a graphics processing unit (GPU)) provide graphics and video signals between the computer 1402 and external display(s) 1438 (e.g., LCD, plasma) and/or onboard displays 1440 (e.g., for portable computer). The graphics interface(s) 1436 can also be manufactured as part of the computer system board.

The computer 1402 can operate in a networked environment (e.g., IP-based) using logical connections via a wired/wireless communications subsystem 1442 to one or more networks and/or other computers. The other computers can include workstations, servers, routers, personal computers, microprocessor-based entertainment appliances, peer devices or other common network nodes, and typically include many or all of the elements described relative to the computer 1402. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1402 connects to the network via a wired/wireless communication subsystem 1442 (e.g., a network interface adapter, onboard transceiver subsystem, etc.) to communicate with wired/wireless networks, wired/wireless printers, wired/wireless input devices 1444, and so on. The computer 1402 can include a modem or other means for establishing communications over the network. In a networked environment, programs and data relative to the computer 1402 can be stored in the remote memory/storage device, as is associated with a distributed system. It will be appreciated that the network connections shown are exemplary and other means of establishing a communications link between the computers can be used.

The computer 1402 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated and described aspects can be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented visualization method executable via a processor and memory, comprising:
   receiving a request for a component to be employed in an execution environment;
   based on a target data type of a user experience and an execution platform of a composition host in the execution environment, selecting a particular component definition of a plurality of component definitions associated with the component;
   selecting one or more data definitions for the selected component definition based on the target data type of the user experience;
   at environment runtime, based on the execution platform of the composition host in the execution environment, automatically composing the one or more selected data definitions with the component definition to output the component in the execution environment, the component comprising a platform independent container component that is a container for a base component;
   creating the container component when the requested component is not found;
   loading the container component with one or more of the base component's associated data type properties; and
   outputting the container component as the component.

2. The method of claim 1, further comprising searching for the component definition based on a data type of the requested component when the component definition is not found.

3. The method of claim 1, further comprising creating a custom component based on absence of the component requested.

4. The method of claim 1, further comprising applying a global variable to the component to enable data exchange between unrelated data contexts.

5. The method of claim 1, further comprising overriding a global variable with a private variable to impose the private variable on one or more child components of the component.

6. The method of claim 1, wherein the container component does not have a custom implementation.

7. The method of claim 1, wherein the output component binds associated component properties to data context elements to link child components.

8. A computer-implemented visualization method executable via a processor and memory, comprising:
   receiving a request for a component based on a component execution environment;
   based on an execution platform of a composition host in the execution environment and a target data type of a user experience, selecting a particular component definition of a plurality of component definitions associated with the component;
   based on the target data type of the user experience, selecting one or more data definitions for the component definition if the component definition is found;
   creating a custom component based on the target data type related to the requested component when the component definition is not found;
   applying a global variable to the component or the custom component or both to enable data exchange between unrelated data contexts;
   at environment runtime, based on the execution platform of the composition host in the execution environment, automatically composing the one or more data definitions with the component definition to output the component in the execution environment, the component comprising a platform independent container component that is a container for a base component;
   creating the container component when the requested component is not found;
   loading the container component with one or more of the base component's associated data type properties; and
   outputting the container component as the component.

9. The method of claim 8, further comprising overriding the global variable with a private variable to impose the private variable on one or more child components of the component.

10. The method of claim 8, further comprising defining data to be passed to the component via a parameter node.

11. The method of claim 8, further comprising composing a parent component that includes bindings of properties to child components and bindings of the properties to data components.

12. The method of claim 8, wherein the container component does not have a custom implementation.

13. A computer-implemented visualization system having computer readable memory that stores executable instructions executed by a processor, comprising:

a store configured to store definitions that include one or more component definitions and data definitions for components and data associated with one or more user experiences; and a composition engine configured to, at environment runtime, automatically and declaratively compose an instance of an output component based on a store definition, a target data type of a user experience of a visualization host in an execution environment and an execution platform of a composition host in the execution environment, the output component specific to the user experience of the visualization host in the execution environment, the output component comprising a platform independent container component that is a container for a base component, the base component selected from a plurality of component definitions based on at least one of the store definitions, the execution platform of the composition host in the execution environment and the target data type of the user experience, the composition engine further configured to create the container component when the requested component is not found, load the container component with one or more of the base component's associated data type properties, and output the container component as the output component.

14. The system of claim 13, wherein the output component includes the base component, the container component, or a combination of base and container components.

15. The system of claim 13, further comprising a component registry via which a component is searched based on the target data type.

16. The system of claim 13, wherein the output component is composed based on a data context.

17. The system of claim 13, wherein the output component binds associated component properties to data context elements to link child components.

18. The system of claim 13, wherein the composition engine includes global variables that enable data exchange between output components in unrelated data contexts.

19. The system of claim 1, wherein the container component does not have a custom implementation.

20. The system of claim 13, wherein the system is configured to override a global variable with a private variable to impose the private variable on one or more child components of the component.

* * * * *